United States Patent [19]

Miyakoshi et al.

[11] Patent Number: 4,609,202
[45] Date of Patent: Sep. 2, 1986

[54] TELESCOPIC FRONT SUSPENSION

[75] Inventors: Shinichi Miyakoshi; Toshifumi Yamamoto; Yoshio Negishi, all of Saitama, Japan

[73] Assignee: Honda Giken Kogyo Kabushiki Kaisha, Tokyo, Japan

[21] Appl. No.: 616,745

[22] Filed: Jun. 4, 1984

[30] Foreign Application Priority Data

Jun. 3, 1983 [JP] Japan .................................. 58-99101

[51] Int. Cl.⁴ .............................................. B62K 11/00
[52] U.S. Cl. .................................... 280/276; 180/219; 267/64.12
[58] Field of Search .......................... 280/276; 180/219; 188/300; 267/64.12

[56] References Cited

U.S. PATENT DOCUMENTS

| 2,756,070 | 7/1956 | Torre | 280/276 |
| 3,989,261 | 11/1976 | Kawaguchi | 280/276 |
| 4,424,980 | 1/1984 | Tsukamoto et al. | 280/276 |
| 4,437,678 | 3/1984 | Schultz | 280/276 |
| 4,511,156 | 4/1985 | Offenstadt | 280/276 |

FOREIGN PATENT DOCUMENTS

| 917411 | 7/1949 | Fed. Rep. of Germany | 280/276 |
| 611961 | 10/1926 | France | 280/276 |
| 843817 | 7/1939 | France | 280/276 |
| 451878 | 9/1949 | Italy | 280/276 |
| 2273 | of 1898 | United Kingdom | 280/276 |
| 1034455 | 6/1966 | United Kingdom | 280/276 |

Primary Examiner—Ira S. Lazarus
Attorney, Agent, or Firm—Armstrong, Nikaido, Marmelstein & Kubovcik

[57] ABSTRACT

A telescopic front suspension including a bottom case (9; 31; 83; 111; 151) supporting a front wheel of a vehicle, and a fork pipe (8; 32; 84; 112; 152) slidably fitted in the bottom case. The telescopic front suspension has a restriction mechanism (18a; 19; 47, 48, 70, 71, 135, 136; 178, 179) for restricting, at a predetermined degree of contraction between the bottom case and the fork pipe, the relative expansion between the bottom case and the fork pipe.

8 Claims, 18 Drawing Figures

TELESCOPIC FRONT SUSPENSION

BACKGROUND OF THE INVENTION

1. Field of the Invention

The present invention relates to a telescopic suspension, and more particularly, to a telescopic suspension for suspending a front wheel, for motorcycles and motored tricycles.

2. Description of Relevant Art

Generally speaking, such type of vehicle that is driven by an engine and has front and rear wheels respectively equipped with dampers tends to rise at the front part of a vehicle body and drive at the rear part thereof when starting or quickly accelerating. Particularly, in the case of a motorcycle or motored tricycle for racing or off-road driving, such tendency is noticeable so as to often experience having rise the front wheel as well together with the front part of the vehicle body. The rising of the front part of the vehicle body causes upward displacements of the center of gravity of the vehicle body, while it is well known that, when the center of gravity is upwardly displaced, the acceleration (driving force) becomes reduced in comparison with that without upward displacements thereof, which appears, particularly in racing, in the form of a time loss or delay.

The solution of such problem has been difficult, particularly for a motorcycle or motored tricycle employing a telescopic suspension for the front wheel.

SUMMARY OF THE INVENTION

An object of the present invention is to provide a telescopic front suspension for motorcycles and motored tricycles, which is able to control the rising of a vehicle body as well as the upward displacement of the center of gravity thereof, when starting such vehicle, to thereby contribute to the improvement of accelerating nature in the starting stage.

According to the present invention, there is provided a telescopic front suspension comprising a bottom case supporting a front wheel of a vehicle, a fork pipe slidably fitted in the bottom case, and a restriction mechanism for restricting, at a predetermined degree of contraction between the bottom case and the fork pipe, the relative expansion between the bottom case and the fork pipe.

The above and further features, objects and advantages of the present invention will more fully appear from the following detailed description of the preferred embodiments of the invention when the same is read in conjunction with the accompanying drawings.

DETAILED DESCRIPTION OF THE PREFERRED EMBODIMENTS

There will be described hereinbelow a quintuple of embodiments of the present invention with reference to the accompanying drawings, in which FIGS. 1 to 5 refer to the first embodiment, FIGS. 6 to 9 to the second embodiment, FIGS. 10 to 12 to the third embodiment, FIGS. 13 to 15 to the fourth embodiment, and the remaining FIGS. 16 to 18 to the fifth embodiment, as briefly described above.

Figures 1, 2, 3:
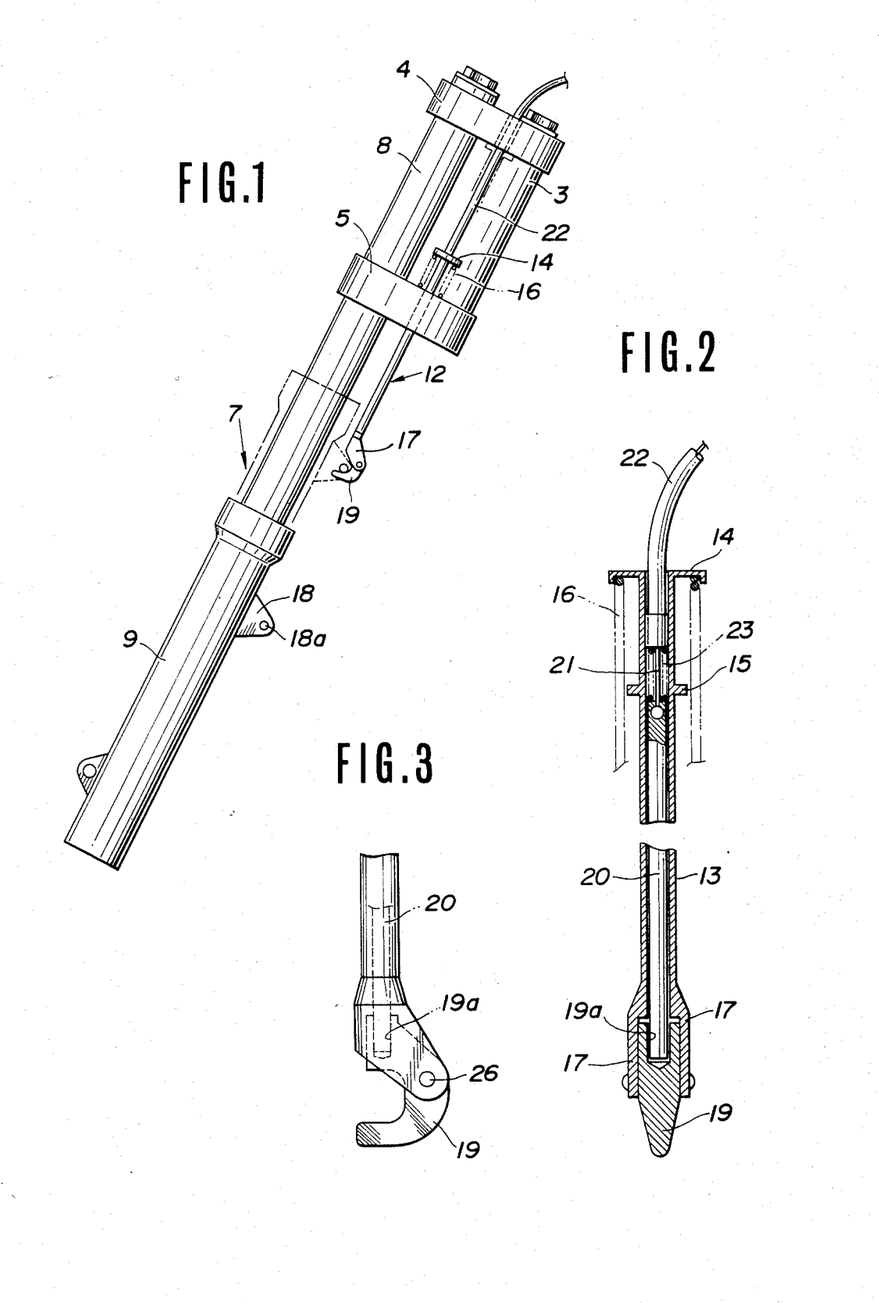
FIG. 1 is a side view of a telescopic suspension according to a first embodiment of the invention.
FIG. 2 is an enlarged side view of a restriction mechanism for restricting at a predetermined degree of contraction the expansion of the suspension of FIG. 1.
FIG. 3 is an enlarged side view of an essential part of the restriction mechanism of FIG. 2.
Figure 4:
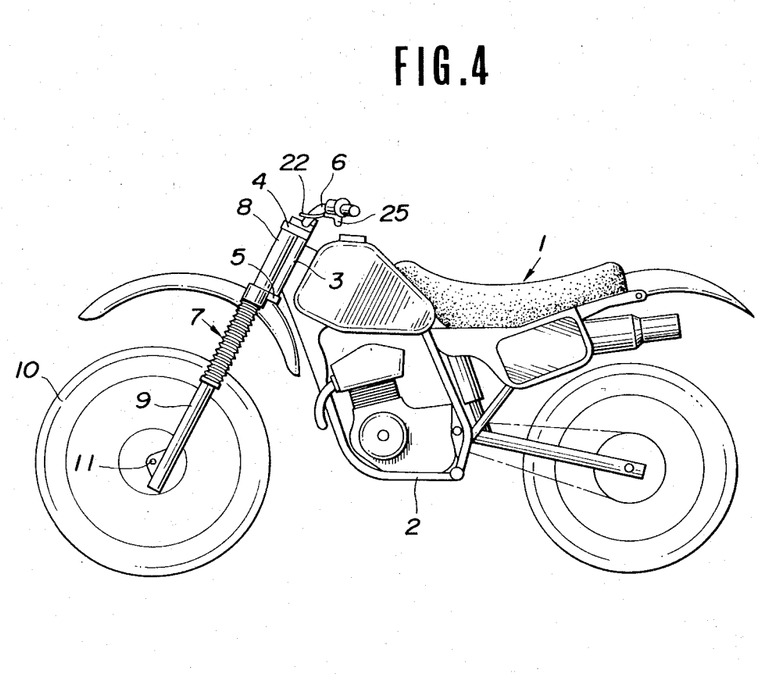
FIG. 4 is a side view of a motorcycle equipped with the suspension of FIG. 1.
Figure 5:
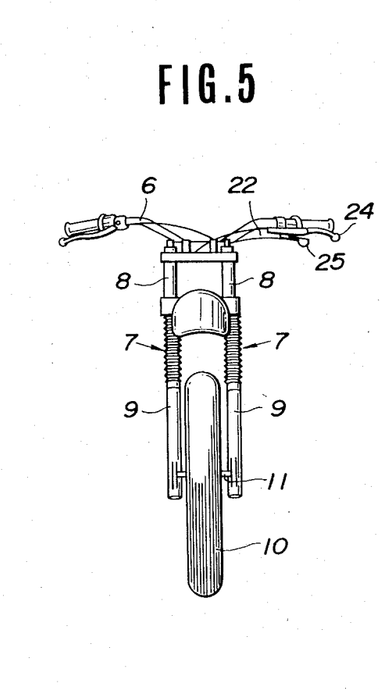
FIG. 5 is a front view of a front-wheel steering system of the motorcycle of FIG. 4.

Referring first to FIGS. 1 to 5, with particular reference to FIG. 1, designated at reference numeral 3 is a head tube attachable in a well-known manner to the front end of a body frame 2 such as of a motorcycle 1 shown illustratively and in no limited way by FIGS. 4 and 5. The head tube 3 is provided with upper and lower bridges 4, 5 secured to the upper and lower ends thereof, respectively. The upper and lower bridges 4, 5 have provided therethrough a pair of fork pipes 8 disposed either at the left and right, the fork pipes 8 constituting the upper part of a telescopic suspension 7 according to the first embodiment of the invention. The fork pipes 8 are each respectively slidably fitted in one of a pair of bottom cases 9 constituting the lower part of the telescopic suspension 7, the bottom cases 9 supporting between the respective lower ends thereof an axle 11 of a front wheel 10 as shown in FIG. 5.

The telescopic suspension 7 is provided with a restriction mechanism 12 for restricting at a predetermined degree of contraction the expansion of the suspension 7.

As shown in FIGS. 1 and 2, the restriction mechanism 12 has a hollowed outer pipe 13 provided through the lower bridge 5, the outer pipe 13 being integrally formed thereon with a flange 14 around the upper end thereof and with a stopper 15 around a peripheral position thereof downwardly spaced a little from the flange 14. When the outer pipe 13 is fitted in the lower bridge 5, the restriction mechanism 12 has a return spring 16 compressed to be interposed between the upper face of the lower bridge 5 and the lower face of the flange 14. Moreover, the outer pipe 13 is formed at the lower end thereof into a bifurcate portion 17, in which is pivotally fitted a hook 19 configured substantially into the form of a letter L. The hook 19 is adapted to be hookable on a lock pin 18a planted at either end thereof into each of a pair of brackets 18 which are each respectively secured to the upper part of one of the bottom cases 9.

As shown in FIGS. 2 and 3, the outer pipe 13 has therein a rod 20 slidably inserted therealong and in the upper part thereof a cable tube 22 secured thereto at its distal end, which cable tube 22 has provided therethrough a cable wire 21 connected at its distal end to the upper end of the rod 20, while a spring 23 is compressed to be interposed between the distal end of the cable tube 22 and the upper end of the rod 20, thereby downwardly biasing the rod 20, so that with the resiliency of the spring 23 the rod 20 is normally forced at the lower end thereof into a locking hole 19a formed in the hook 19.

As shown in FIGS. 4 and 5, the cable tube 22 may be stretched along a handle pipe 6 of the motorcycle 1, to favorably permit the cable wire 21 to be operatively connected at the operation end thereof to a suitable hand lever member 25 provided in the vicinity of a clutch lever 24 at either end of the handle pipe 6.

The function of the restriction mechanism 12 will be detailed below.

The restriction mechanism 12 is adapted for restricting the expansion of the telescopic suspension 7 as described above. Such restricting function of the restriction mechanism 12 is brought into effect when the lock pin 18a is hooked by the hook 19, i.e., when the bottom cases 9 as lower components of the telescopic suspension 7 are restricted or locked of their relative distance to the fork pipes 8 as upper components thereof. In order to bring into existence such locked state of the suspension 7, when effecting the restricting function of the mechanism 12, the fork pipes 8 are to be pushed down and further the outer pipe 13 is to be pulled down against the resiliency of the return spring 16, while leaving the rod 20 as it is inserted in the hook 19, to thereby have the hook 19 clasp on the lock pin 18a of the bottom cases 9, whereby the telescopic suspension 7 becomes restricted against the expansion at a predetermined degree of contraction thereof which corresponds to the relative position the bottom cases 9 as shown by alternate long and two short dashes line in FIG. 1 have with respect to the fork pipes 8. As a result, the suspension 7 is favorably allowed to have the center of gravity thereof kept relatively low, while permitting any vehicle to which the suspension 7 is applicable to be improved of the foot-grounding nature when starting the vehicle. Incidentally, although the locking position of the suspension 7 as shown in FIG. 1 is simply given in the form of a relative position of the bottom cases 9 to the fork pipes 8, i.e., by an upwardly moved position of the bottom cases 9, the actual locking is to be effected by downwardly moving the fork pipes 8 till they have the same relative distance to the bottom cases 9 as the latter 9 as shown by alternate long and two short dashes line in FIG. 1 has to the former 8.

When desired after starting the vehicle, the suspension 7 may be released from such locked state to render effective its inherent damping function, by simply operating the hand lever member 25 disposed on the handle pipe 6. Namely, by a gripping operation to the lever member 25, the rod 20 can be pulled upwardly, thus being disengaged from the hook 19, which hence becomes rotatable about a pin 26 shown in FIG. 3. Consequently, the hook 19, which is upwardly biased together with the outer pipe 13 by the resiliency of the return spring 16, will be caused to rotate to unclasp itself from the lock pin 18a of the bottom cases 9 and move upwardly as it is.

Figures 6, 7, 8, 9:
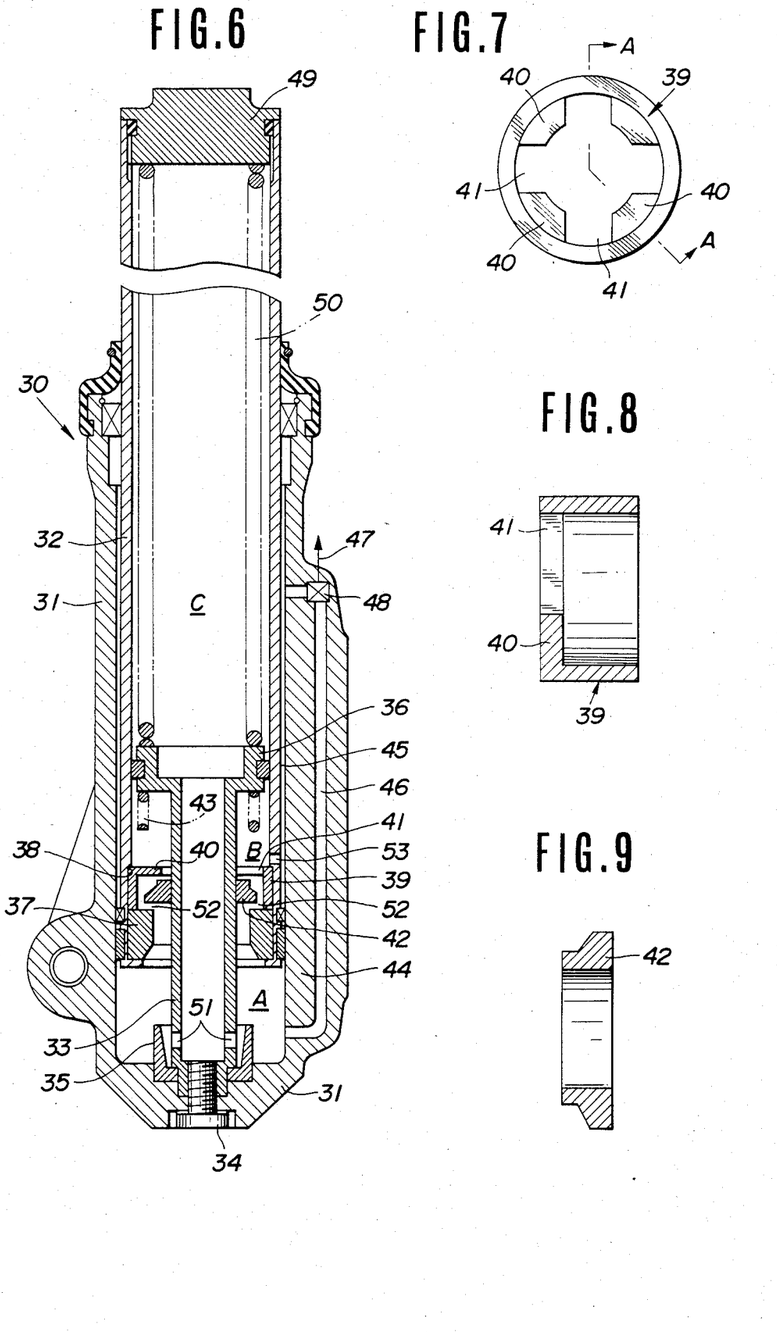
FIG. 6 is a longitudinal sectional view of a telescopic suspension according to a second embodiment of the invention.
FIG. 7 is an enlarged plan view of a rebound seat of the telescopic suspension of FIG. 6.
FIG. 8 is a sectional view taken along line A—A of FIG. 7.
FIG. 9 is an enlarged sectional view of a free valve of the telescopic suspension of FIG. 6.

Referring now to FIGS. 6 and 9, there will be described hereinbelow a telescopic suspension according to the second embodiment of the invention, which comprises a telescopic fork assembly having incorporated therein a hydraulic restriction mechanism.

In FIG. 6, designated at reference numeral 30 is the entire part of the telescopic fork assembly, which has a fork pipe 32 slidably fitted in a bottom case 31 and a seat pipe 33 screwed to be secured at the lower end thereof to the bottom part of the bottom case 31 by means of a bolt 34 inserted through this bottom part. The seat pipe 33 has at the lower end thereof an oil lock piece 35 fixedly fitted thereon and at the upper end thereof a piston 36 integrally formed thereon and put in slidable contact with the inner wall of the fork pipe 32. The fork pipe 32 has at the lower end thereof an oil lock collar 37 fixedly fitted therein and adapted to be fittable on the oil lock piece 35 when the fork pipe 32 is caused to come down. In the lower end part of the fork pipe 32, on the inner circumference thereof, there is formed a step 38 on which abuts the upper circumferential edge of a rebound seat 39 arranged so as to abut at the lower end thereof as well on the upper end of the oil lock collar 37.

As shown in FIGS. 7 and 8, the rebound seat 39 is configured in a short tubular form opening at both upper and lower ends thereof and having, at the upper end thereof, a plurality of inward projections 40 formed on the inner circumference thereof and an opening 41 defined by the inward projections 40.

As shown in FIG. 6, in the inner space of the rebound seat 39, there is disposed a free valve 42 slidably fitted on the seat pipe 33, which free valve 42 has such a ring-like configuration as shown in FIG. 9. The free valve 42 is adapted such that, when brought down till its bottom face abuts on the upper end of the oil lock collar 37, it interrupts the associated communication between a lower hydraulic chamber A defined by and between the lower end of the fork pipe 32 and the bottom part of the bottom case 31 and a intermediate hydraulic chamber B defined by and between the underface of the piston 36 of the seat pipe 33 and the upper face of the rebound seat 39 and that, when moved upwardly to bring its top face into abutment with the inward projections 40 of the rebound seat 39, it permits the communication between the hydraulic chambers A and B through the opening 41 of the rebound seat 39. Moreover, in the hydraulic chamber B, there is provided a spring 43 to prevent, when the fork assembly 30 is expanded, the upper face of the rebound seat 39 for colliding against the underface of the piston 36 of the seat pipe 33.

Further, the bottom case 31 has formed on the lateral side thereof, at the right in FIG. 6, a bulged portion 44 through which is drilled an oil bypass 46 opening at the lower end thereof to the lower hydraulic chamber A and at the upper end thereof to a gap 45 defined by and between the bottom case 31 and the fork pipe 32, the bypass 46 having therein a lock valve 48 accessible for operation from outside of the fork assembly 30. The upper end of the fork pipe 32 is blocked with a cap 49 supporting at the lower face thereof the upper end of a return spring 50 of which lower end is supported by the upper face of the piston 36 of the seat pipe 33.

Above the piston 36, the fork assembly 30 has an upper hydraulic chamber C defined by the inner wall of the fork pipe 32, the hydraulic chamber C being communicatable, through the seat pipe 33, a plurality of oil holes 51 opened in the lower end part of the seat pipe 33, the lower hydraulic chamber A, and a gap 52 between the oil lock collar 37 and the free valve 42, with the intermediate hydraulic chamber B, while the hydraulic chamber A is further communicatable with the hydraulic chamber B via another route including the oil bypass 46, the gap 45 between the bottom case 31 and the fork pipe 32, and an oil hole opened in the lower part of the fork pipe 32 at a slightly higher position than the upper face of the rebound seat 39.

There will be described below the function of the telescopic suspension according to the second embodiment of the invention as applied to a motorcycle.

At first, before starting the motorcycle, the fork assembly 30 is assumed to be contracted as circumstances require. Under such state, the lock valve 48 in the oil bypass 46 is to be closed by an external operation, to thereby shut the bypass 46, thus leaving alive, as communication route between the lower and intermediate hydraulic chambers A and B, no more than that via the gap 52 between the oil lock collar 37 and the free valve 42. Accordingly, in any attempt to expand the fork assembly 30 in such contracted state, the associated ascent of the fork pipe 32 will bring the the upper end of the oil lock collar 37 into abutment with the bottom face of the free valve 42, closing the gap 52 therebetween, thus completely interrupting the communication between the hydraulic chambers A and B. Consequently, the fork assembly 30 is kept in the contracted state, i.e., locked or restricted against the expansion therefrom.

Even in such locked state, the fork assembly 30 is not restricted against additional contraction therefrom. Namely, when the fork pipe 32 is additionally pushed down, the gap 52 between the oil lock collar 37 and the free valve 42 becomes open, thus permitting the intercommunication therethrough between the hydraulic chambers A and B, so that the hydraulic oil in the chamber A can flow into the chamber B while achiving necessary damping effect.

When desired after the motorcycle as started has entered a normal running state, the lock valve 48 in the oil bypass 46 is to be opened by external operation, to thereby render alive the communication route between the hydraulic chambers A and B through the bypass 46, whereby the hydraulic oil in the chamber B can flow into the chamber A via the oil hole 53, the gap 45, and the bypass 46, thus fully permitting the fork assembly 30 to make both expansion and contraction while exercising its inherent damping effect. In this respect, it will be easily understood that, also under such unlocked state, the contraction is effectable through the gap 52 between the oil lock collar 37 and the free valve 42.

Figures 10, 11:
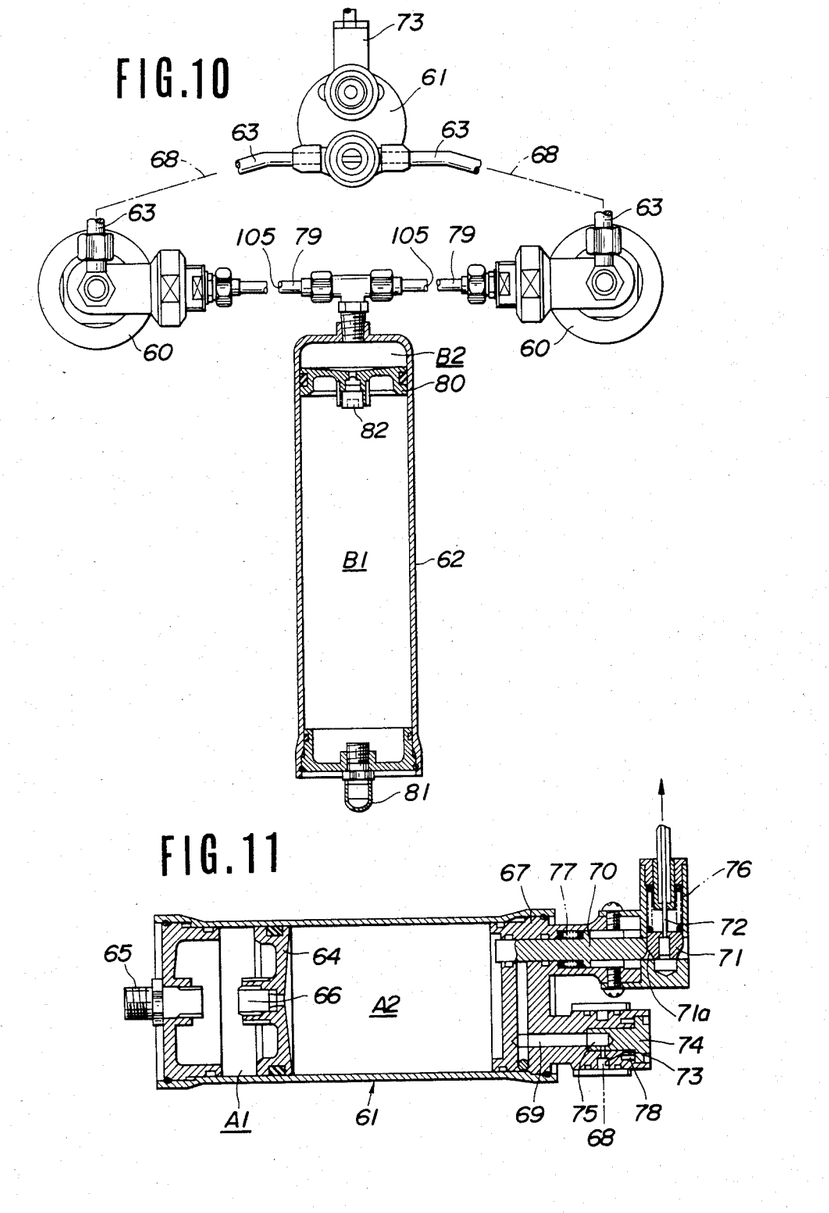
FIG. 10 is a plan view, partly in section, of a telescopic suspension according to a third embodiment of the invention.
FIG. 11 is an enlarged sectional view of a first sub-tank of the telescopic suspension of FIG. 10.
Figure 12:
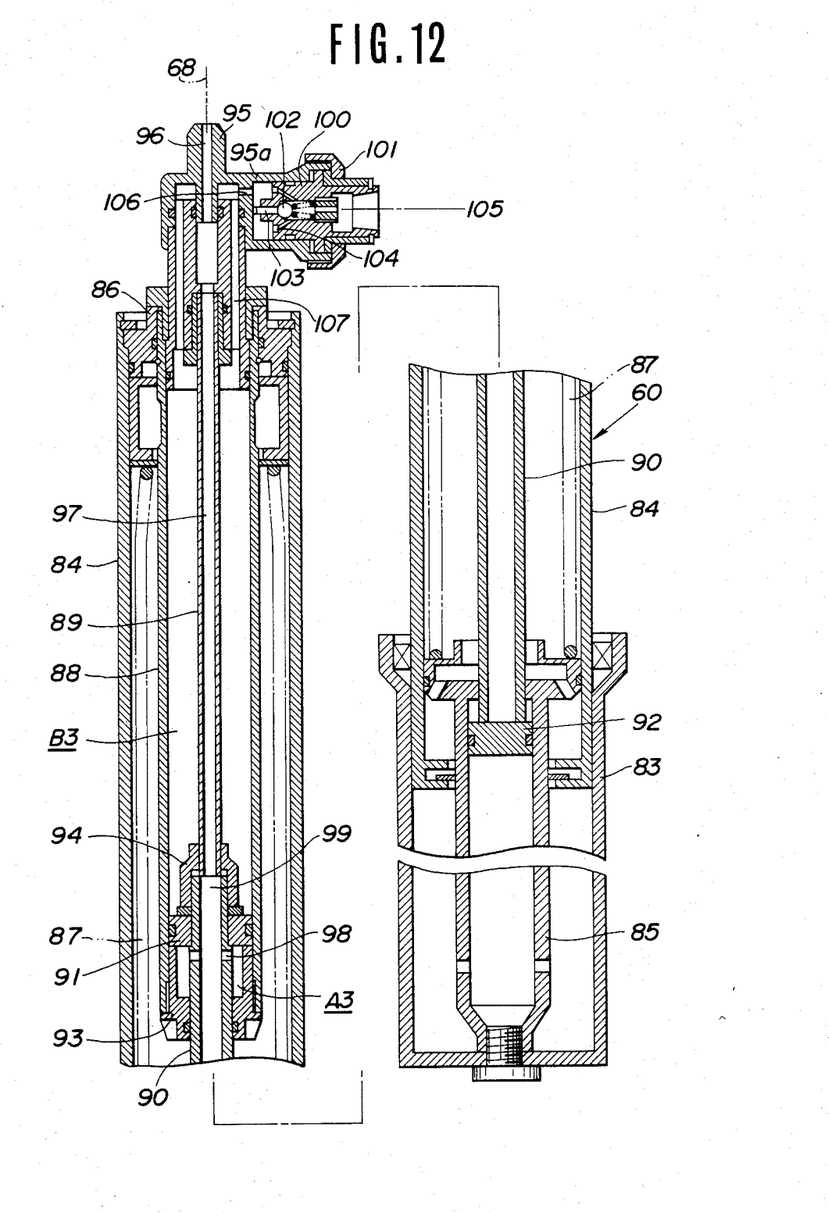
FIG. 12 is an enlarged longitudinal sectional view of a fork assembly of the telescopic suspension of FIG. 10.

Referring now to FIGS. 10 to 12, there will be described hereinbelow a telescopic suspension according to the third embodiment of the invention, which comprises a pair of telescopic fork assemblies and first and second sub-tanks both respectively communicating with both of the fork assemblies.

In FIG. 10, designated at reference numerals 60, 60 are the telescopic fork assemblies disposed either at the left and right, and 61 and 62 are the first and second sub-tanks, respectively. The first sub-tank 61 has a pair of communication pipes 63, 63 leading each respectively to one of the fork assemblies 60, 60. Also the second sub-tank 62 has a pair of communication pipes 79, 79 leading likewise to the form assemblies 60, 60.

As shown in FIG. 11, the first sub-tank 61 has fitted therein a piston 64 separating the interior thereof into a gas-pressurizing chamber A1 and a hydraulic chamber A2, which chambers A1 and A2 are provided with a gas filling valve 65 and an air vent valve 66, respectively. The hydraulic chamber A2 is thus defined at one end thereof by the piston 64 and at the opposite end thereof by a block member 67 tight-fitted to be plugged into the corresponding end of the sub-tank 61. The block member 67 has formed therein a an oil path 69 interconnecting the hydraulic chamber A2 with a pair of external oil paths 68, 68 in the communication pipes 63, 63. The oil path 69 in the block member 68 is interruptable by advancing thereinto the front end of a lock rod 70 slidably fitted in the block member 67 and normally biased backwardly with a return spring 77. To enable the actuation of the lock rod 70 which may be tapered at the rear end thereof, the block member 67 has slidably fitted therein an actuation member 71 arranged to be movable in the perpendicular direction to the lock rod 70 by means of a cable wire 72 operable from outside of the sub-tank 61, which actuation member 71 is normally biassed to be retreated with a return spring 77 and has a tapered peripheral portion 71a abutting on the rear end of the lock rod 70, so that the oil path 69 can be opened and closed by sliding the lock rod 70 with external operation to the cable wire 72. Moreover, in the oil path 69, near an outlet 73 thereof provided for the communication with the external oil paths 68, 68, there is installed a restoring time control valve 74 having a cylindrical portion formed therethrough with a plurality of flow control orifices 75 different of the diameter, the orifices 75 being adapted to alternatively serve as a part of the oil path 69. The control valve 74 is rotatably fitted in the block member 67 so as to be adjustable from outside of the sub-tank 61, and implemented for the convenience of adjustment thereof by means of a clicking mechanism 78 consisting of a plurality of steel balls and a coil spring.

As shown in FIG. 10, the second sub-tank 62 has fitted therein a piston 80 separating the interior thereof into a gas-pressurizing chamber B1 and a hydraulic chamber B2 communicating with the fork assemblies 60, 60 through a pair of external oil paths 105, 105 in the communication pipes 79, 79, which chambers B1 and B2 are provided with a gas filling valve 81 and an air vent valve 82, respectively, in a manner similar to that of the first sub-tank 61. Namely, the gas filling valve 81 needed to be externally accessible is provided across a plug member tight-fitted into the chamber B1 side end of the sub-tank 62, while the air vent valve 82 is disposed in the piston 80.

As shown in FIG. 12, each of the telescopic fork assemblies 60, 60 includes a fork pipe 84 slidably fitted in a bottom case 83 and a seat pipe 85 secured at the lower end thereof to the bottom part of the bottom case 83, the seat pipe 85 being slidably fitted at the upper end thereof in the fork pipe 84. The fork pipe 84 has therein, at the upper end thereof, a block member 86 fixedly fitted therein and, in the upper part thereof, a cylindrical jack member 88 extending therealong, the jack member 88 being fixedly inserted at the upper end thereof into the block member 86, while a return spring 87 surrounding the jack member 88 is interposed between the seat pipe 85 and the block member 86. Moreover, the jack member 88 has coaxially provided therethrough a small-diameter pipe 89 secured at the upper end thereof to the block member 86, the pipe 89 defining together with the jack member 88 an annular space B3, and the upper part of a hollowed large-diameter rod 90 extending downwardly along the axis of the fork pipe 84 into the interior of the seat pipe 85, the rod 90 having at the upper end thereof an upper piston 91 fixed thereon and slidably fitted in the jack member 88 and at the lower end thereof a lower piston 92 secured thereto and slidably fitted in the seat pipe 85. The jack member 88 is plugged at the lower end thereof with a cap 93 having a cylindrical upper extension adapted for the restriction of downward movement of the upper piston 91, the upper extension defining together with the rod 90 and the piston 91 an annular hydraulic chamber A3. Further, on the upper end of the large-diameter rod 90, there is capped a temple-bell shaped block member 94 slidably fitted on the small-diameter pipe 89.

Besides above, the block member 86 at the upper end of the fork pipe 84 is provided with a housing 90 formed therethrough with an oil path 96 interconnecting an inner oil path 97 in the small-diameter pipe 89 with one of the external oil paths 68, 68 in the communication pipes 63, 63 connnected to the first sub-tank 61. Further, the large-diameter rod 90 has, in the circumferential wall thereof defining the hydraulic chamber A3, a plurality of oil holes 98 opened therethrough, thus permitting the hydraulic chamber A2 in the first sub-tank 61 to communicate with the hydraulic chamber A3 in each fork assembly 60, through the oil path 69 in the block member 67, the external oil path 68, the oil path 96 in the housing 95, the inner oil path 97 of the small-diameter pipe 89, and the oil holes 98. The housing 95 consists of a cap-like body portion with the oil path 96 coaxially formed therethrough and a cylindrical projection 95a extending radially outwardly of the body portion, which cylindrical projection 95a has coaxially fitted therein a slidable member 100 adjustable of the axial position from outside of the housing 95 by operating a knob 101 rotatably fitted on the outer end of the cylindrical portion 95a, the knob 101 being screwed on the slidable member 100. When the slidable member 100 is slided to the left in FIG. 12, a steel ball 102 which is normally biased so as to block an axial oil path formed through the slidable member 100 will be forced to the right by a floating pin 103 in this oil path, which path thus becomes open, admitting hydraulic oil to the right. By means of a check valve 104 put on the left face of the slidabble member 100 and a plurality of slots leading thereto, the oil path in the slidable member 100 is adapted so as to admit hydraulic oil to the left as well. The oil path in the slidable member 100 is connected at the right end thereof to the hydraulic chamber B2 of the second sub-tank 62, through one of the external paths 105, 105 in the communication pipes 79, 79, and at the left end thereof to the annular space B3 as a hydraulic chamber in the fork assembly 60, through an oil hole 106 formed in the housing 95 and a plurality of oil paths 107 formed through the block member 86, thus permitting the chambers B2 and B3 to communicate with each other.

There will be described below the function of the telescopic suspension according to the third embodiment of the invention as applied to a motorcycle.

At first, before starting the motorcycle, the cable wire 72 of the first sub-tank 61 is assumed to be once pulled, to permit the lock rod 70 to be biased to its normal position. Concurrently, at each of the fork assemblies 60, 60, the knob 101 of the housing 95 is to be to be rotated to shift the slidable member 100 to the left in FIG. 12, thus causing the steel ball 102 to move rightwardly, to thereby open the oil path in the slidable member 100. Then, gas is to be filled through the gas filling valve 65 in the gas-pressurizing chamber A1 of the first sub-tank 61, thus causing the piston 64 to slide to the right in FIG. 11, to thereby let hydraulic oil of the hydraulic chamber A2 run through the oil path 69 in block member 67, one of the flow control orifices 75 of the restoring time control valve 74, the corresponding external oil path 68, the axial oil path 96 in the body portion of the housing 95, the inner oil path 97 of the small-diameter pipe 89, a hollow 99 of the large-diameter rod 90, and the oil holes 98 into the hydraulic chamber A3 of each fork assembly 60. Consequently, the hydraulic pressure in the chamber A3 rises, thus forcing the block member 94 and the upper piston 91 to slide upwardly together with the large-diameter rod 90 along the small-diameter pipe 89, relatively compressing the return spring 87, so that each fork assembly 60 becomes contracted of its stroke. In such process, the hydraulic oil in the annular chamber B3 is admitted through the oil paths 107 in the block member 86, the oil hole 106 of the housing 95, and the oil path in the slidable member 100 into the hydraulic chamber B2 of the second sub-tank 62.

Thereafter, the cable wire 72 is to be released, to have the lock rod 70 advanced to shut the oil path 69, before opening the valve 65 to reduce the inner pressure of the chamber A1 to an atmospheric level, while reversely rotating the knob 101 to close the oil path in the slidable member 100. Then, gas is to be filled through the gas filling valve 81 in the gas-pressurizing chamber B1 of the second sub-tank 62, thereby locking in a contracted state each fork assembly 60 which is thus restricted of the expansion therefrom.

When desired to restore the inherent stroke of each fork assembly 60, the wire cable 72 is to be pulled to have the lock rod 70 unlocked to be biased to the right in FIG. 11, thereby opening the oil path 69 in the block member 67. As a result, the resiliency of the return spring 87 is permitted to cause the hydraulic oil in the hydraulic chamber A3 of each fork assembly 60 to return through the oil holes 98, the hollow 99 of the rod 90, the inner oil path 97 of the pipe 89, the axial oil path 96 in the housing 95, the corresponding external oil path 68, one of the orifices 75, and the oil path 69 in the block member 67 to the hydraulic chamber A2 of the first sub-tank 61, while the orifice diameter of the control valve 74 is properly selectable to adjust the restoring time to be elasped, after the cable wire 72 is pulled, to achieve the inherent stroke of the fork assemblies 60, 60. On the other hand, the hydraulic oil in the hydraulic chamber B2 of the second sub-tank 62 is caused to return, opening the check valve 104 and running through the oil hole 106 in the housing 95 and the oil paths 107 of the block member 86, to the hydraulic chamber B3 of each fork assembly 60. The returned oil in the chamber B3 exerts corresponding hydraulic pressure onto the upper piston 91, which thus goes down till it abuts on the cap 93, thus rendering available the maximum damping stroke. In such state, the total pressure exerting on the upper piston 91 from inside of the hydraulic chamber B3 may be set larger than the reaction from the rod 90 exercising the damping effect or the resiliency of the return spring for biasing the steel ball 102 may be determined to be durable with such reaction, or otherwise the inner pressure of the gas-pressurizing chamber B1 may be correspondingly reduced. In this respect, although the hydraulic chamber B3 is tight-enclosed, excessive inner pressures thereof will force the steel ball to the right in FIG. 12 and can be released through the oil path of the slidable member 100 into the hydraulic chamber B2 of the second sub-tank 62, so that any thermal expansion of hydraulic oil in the chamber B3 can be favorably absorbed and will not adversely affect on the damping characteristic of the telescopic suspension.

Figure 13:
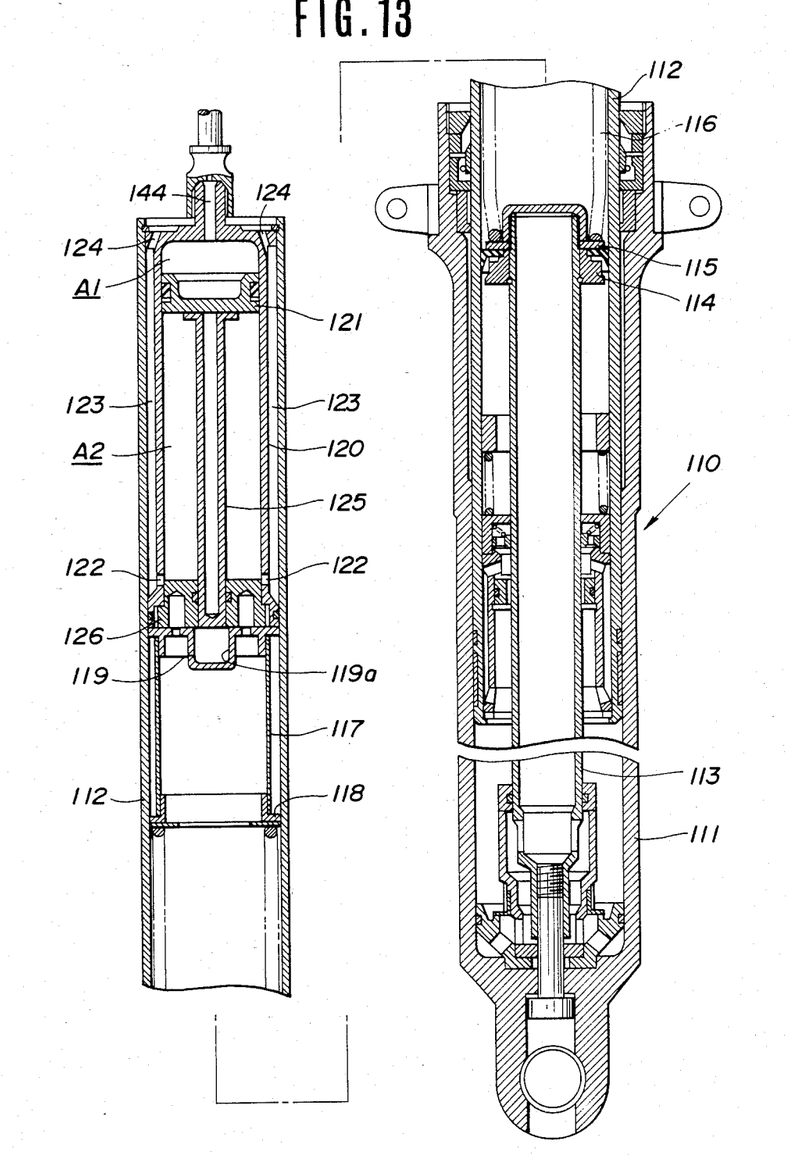
FIG. 13 is a longitudinal sectional view of a fork assembly of a telescopic suspension according to a fourth embodiment of the invention.
Figure 14:
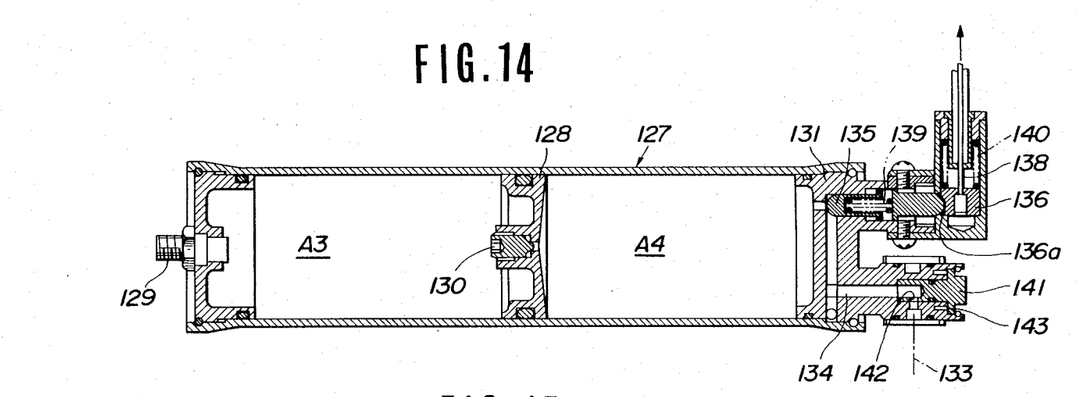
FIG. 14 is a sectional view of a sub-tank of the telescopic suspension of FIG. 13.
Figure 15:
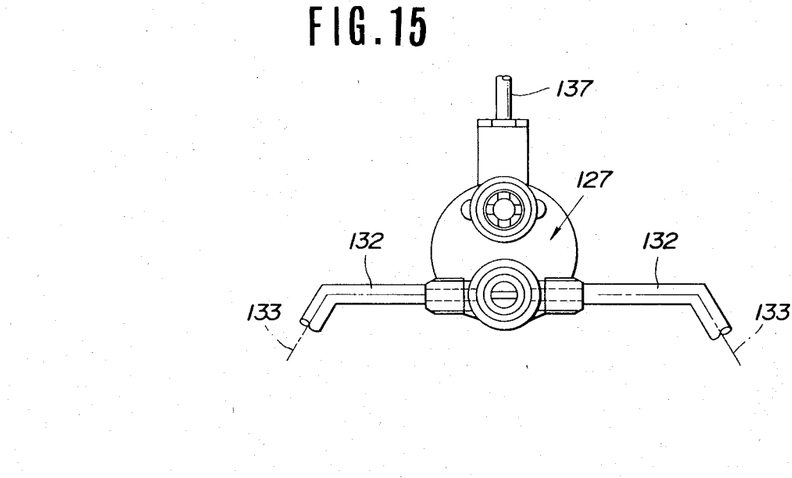
FIG. 15 is a plan view of the sub-tank of FIG. 14.

Referring now to FIGS. 13 to 15, there will be described hereinbelow a telescopic suspension according to the fourth embodiment of the invention, which comprises a pair of telescopic fork assemblies and a single sub-tank corresponding to the first sub-tank of the third embodiment.

In FIG. 13, designated at reference numeral 110 is either of the telescopic fork assemblies. The fork assembly 110 includes a fork pipe 112 slidably fitted in a bottom case 111 and a seat pipe 113 secured at the lower end thereof to the bottom part of the bottom case 111, the seat pipe 113 having at the upper end thereof a piston 114 fixedly fitted thereon and slidably fitted in the fork pipe 112. The upper end of the seat pipe 113 is crowned with a lower spring seat 115 supporting the lower end of a return spring 116 installed in the fork pipe 112. The upper end of the spring 116 is supported by an upper spring seat 118 secured to the lower end of a collar 117. On the upper end of the collar 117 is fixedly mounted an intermediate member 119 having a downward recess 119a formed in the central part of the upper face thereof, the intermediate member 119 being slidably fitted in the fork pipe 112 and adapted to have integrally slide the collar 117 and the spring seat 118. In the upper part of the fork pipe 112, there is fitted a cylindrical jack member 120 secured at the upper end thereof to the upper end of the fork pipe 112. The jack member 120 has slidably fitted therein a piston 121 separating the interior thereof into an upper hydraulic chamber A1 and a lower atmospheric-pressure chamber A2 communicating with the atmospheric air through a plurality of lower air holes 122 opened in the lower side wall of the jack member 120, an annular gap 123 defined by and between the fork pipe 112 and the jack member 120, and a plurality of upper air holes 124 formed through the circumferential egde of the upper end of the jack member 120. The piston 121 in the jack member 120 is provided with a piston rod 125 adapted such that, when brought down, its lower end projects downwardly, past a block member 126 plugged in the lower end of the jack member 120, into the downward recess 119a of the intermediate member 119.

In FIGS. 14 and 15, designated at reference numeral 127 is the sub-tank. The sub-tank 127 has fitted therein a piston 128 separating the interior thereof into a gas-pressurizing chamber A3 and a hydraulic chamber A4, which chambers A3 and A4 are provided with a gas filling valve 129 and an air vent valve 130, respectively. The gas filling valve 129 is provided across a plug member tight-fitted in the chamber A4 side end of the sub-tank 127, while the air vent valve 130 is disposed in the piston 128. The hydraulic chamber A4 is defined at one end thereof by the piston 128 and at the opposite end thereof by a block member 131 tight-fitted to be plugged into the corresponding end of the sub-tank 127. The block member 131 has formed therein an oil path 134 interconnecting the hydraulic chamber A4 with a pair of external oil paths 133, 133 formed each respectively through one of a pair of communication pipes 132, 132. For opening and closing the oil path 134, the block member 131 has slidably fitted therein a lock rod 135 adapted to be advanceable when desired to interrupt the communication of the oil path 134, the lock rod 135 abutting at the rear end thereof against a tapered side wall 136a of an actuation member 136 slidably fitted in the block member 131. The lock rod 135 is externally operable with a cable wire 138 fastened to the actuation member 136, such that, when the wire 138 is pulled, the resulted upward movement of the actuation member 135 causes the lock rod 135 to be shifted back or to the right in FIG. 14 by the resiliency of a return spring 134, thus opening the oil path 134, and that, when the wire 138 is released, the actuation member 136 makes downward movement under the resiliency of a return spring 140, shifting forth the lock rod 135 to the left in FIG. 14, thus closing the oil path 134. Moreover, in the oil path 134, near its outlet provided for the communication with the external oil paths 133, 133, there is installed a restoring time control valve 141 having a cylindrical portion formed therethrough with a plurality of flow control orifices 142 different of the diameter, the orifices 142 being adapted to alternatively serve as a part of the oil path 134. The control valve 141 is rotatably fitted in the block member 131 so as to be adjustable from outside, and implemented for the convenience of adjustment thereof by means of a clicking mechanism 143 consisting of a plurality of steel balls and a coil spring.

There will be described below the function of the telescopic suspension according to the fourth embodiment of the invention as applied to a motorcycle.

The telescopic suspension, which is interposed between a steering head and an axle of a front wheel of the motorcycle, is originally contracted by the load to a balancing position with respect to the resiliency of the spring 116. At first, under such state or at a further contracted position, the cable wire 138 is assumed to be once pulled to render open the oil path 134 in the block member 131, and air in the hydraulic chamber A1, the external oil paths 133, 133, the oil path 134, and the hydraulic chamber A4 is to be completely vented through the air vent valve 130.

Thereafter, the cable wire 138 is to be released to make the lock rod 135 close the oil path 134, and gas is to be filled through the gas filling valve 129 in the gas-pressurizing chamber A3 to be kept under high pressure, whereby the fork assembly 110 is locked in a contracted state and restricted of the expansion therefrom.

When desired after the motorcycle as started has entered a normal running state, the cable wire 138 is to be pulled to have the lock rod 135 unlocked to be shifted to the right in FIG. 14, thus opening the oil path 134. As a result, by the exertion of the high inner pressure of the gas-pressurizing chamber A3, the piston 128 moves rightwardly in FIG. 14, thus causing hydraulic oil in the hydraulic chamber A4 of the sub-tank 127 to flow through the oil path 134, one of the orifices 142, each external oil path 133, and the oil paths 144 in the upper circumferential edge of the jack member 120 into the hydraulic chamber A1 of each fork assembly 110. Consequently, the piston 121 in the jack member 120 moves downwardly, past the position where the lower end of the piston 121 becomes engaged with the downward recess 119a of the intermediate member 119, thus pushing from above, through the collar 117 and the upper spring seat 118, the return spring 116, which thus yields while in turn pushing downwardly the lower spring seat 115 together with the seat pipe 113 and the bottom case 111. For the seat pipe 113 and the bottom case 111 are secured to the axle of the front wheel, the fork assembly 110 is caused to expand by the resiliency of the spring 116, thus restoring the damping stroke to an original length adapted for the normal running of the motorcycle. In such restoring process, by properly rotating the restoring time control valve 141, that one of the orifices 142 which has an optimum diameter may be selected to be put in the oil path 134 of the block member 131, to thereby adjust the restoring time to be elasped to achieve the original damping stroke. Moreover, by the depth of the downward recess 119a of the intermediate member 119, also a time-delayed action control is effectable. In this respect, the restoring time control may be effected by any other suitable means.

Figure 16:
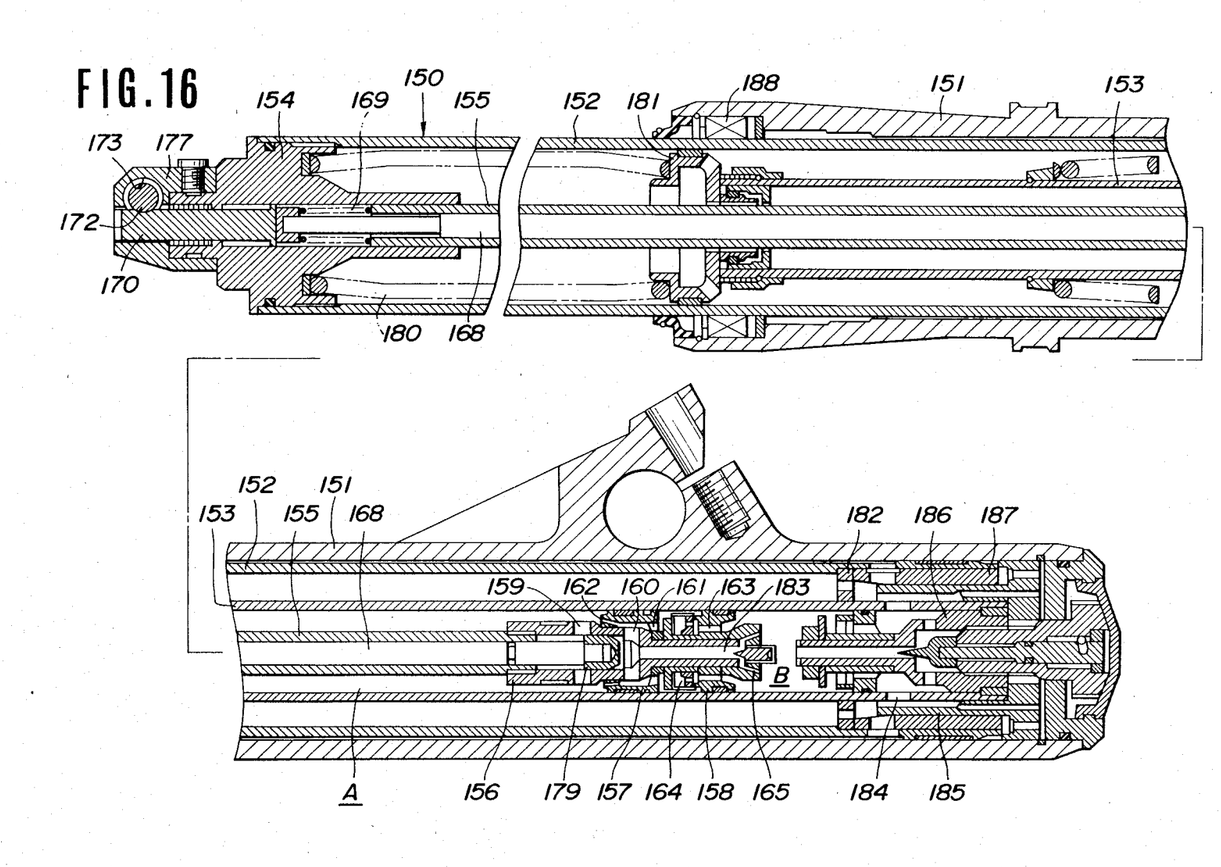
FIG. 16 is a longitudinal sectional view of a fork assembly of a telescopic suspension according to a fifth embodiment of the invention.
Figure 17:
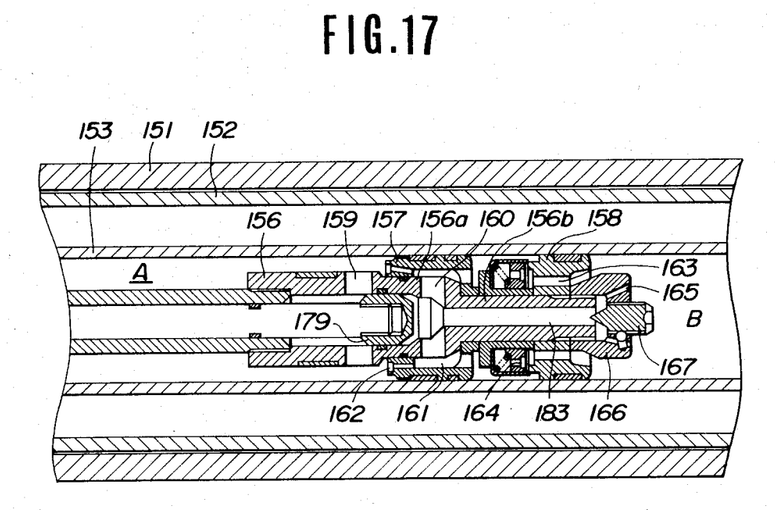
FIG. 17 is an enlarged sectional view of an essential part of the fork assembly of FIG. 16.
Figure 18:
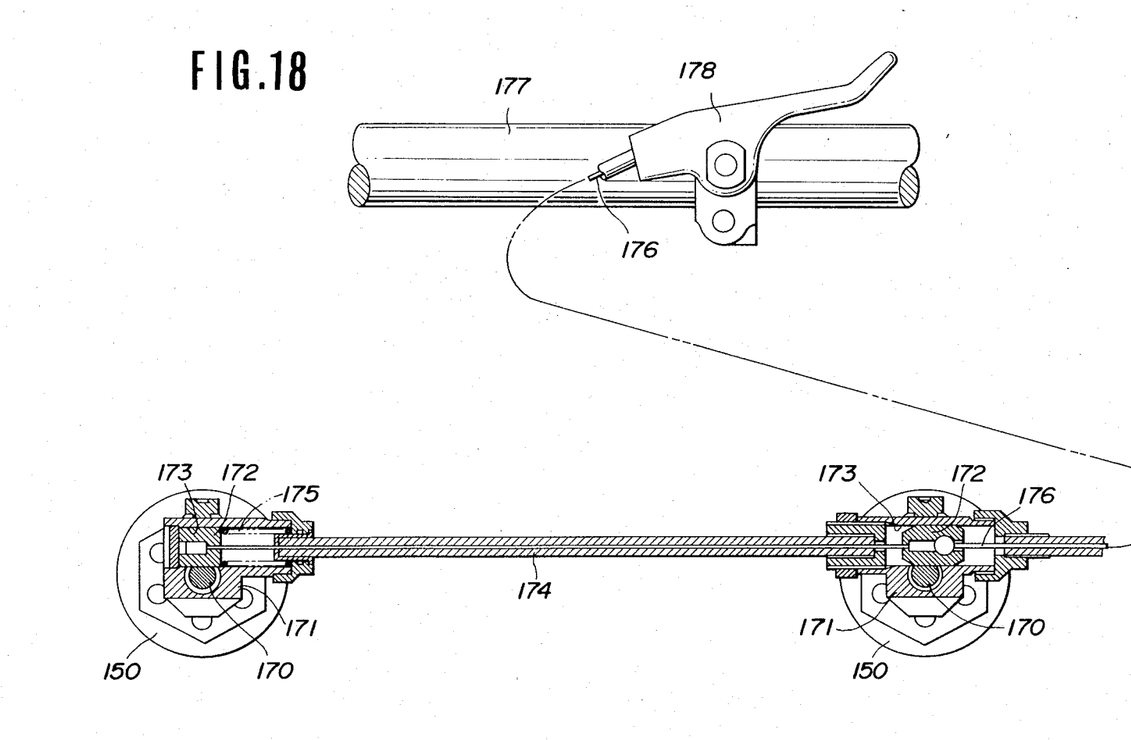
FIG. 18 is a plan view showing a bush rod fixing mechanism of the telescopic suspension of FIG. 16.

Referring now to FIGS. 16 to 18, there will be described hereinbelow a telescopic suspension according to the fifth embodiment of the invention comprising a pair of telescopic fork assemblies, which can effect the restriction of expansion by means of a mechanical structure without the need such as of interupting an oil path.

In FIG. 16, designated at reference numeral 150 is either of the telescopic fork assemblies. The fork assembly 150 includes a fork pipe 152 slidably fitted in a bottom case 151 and a seat pipe 153 secured at the lower end thereof to the bottom part of the bottom case 151. The fork pipe 152 is plugged at the upper end thereof with a fork bolt 154 in which is fixedly fitted the upper end of a hollow rod 155 extending downwardly into the interior of the seat pipe 153.

As shown in FIGS. 16 and 17, the hollow rod 155 has at the lower end thereof a cylindrical holder 157 screwed thereon at its upper end, the cylindrical holder 156 being reduced in the lower part thereof to form a first small-diameter portion 156a with a first piston fitted thereon and a second small-diameter portion 156b with a second piston 158 fitted thereon, which pistons 157, 158 are both slidably fitted in the seat pipe 153. The cylindrical holder 156 has opened therethrough a plurality of upper oil holes 159 located above the first piston 157 and a plurality of lower oil holes 160 located aside of the first piston 157. The first piston 157 has formed therethrough a plurality of oil paths 161 communicating with the oil holes 160, and provided thereon a check valve 162 adapted to open the oil paths 161 when the fork assembly 150 is contracted. The second piston 158 has formed therethrough a plurality of oil paths 163, and provided thereon a check valve mechanism 164 adapted to open the oil paths 163 when the fork assembly 150 is expanded. Moreover, the cylindrical holder 156 has at the lower end thereof a cap 166 screwed thereon and formed with a plurality of orifices 165, the cap 166 having at the lower end thereof a needle 167 coaxially screwed therein so as to be rotatable.

As shown in FIG. 16, the hollow rod 155 has slidably fitted therein a first bush rod 168 inserted therein from above through the fork bolt 154, while the fork bolt 154 has inserted therein a return spring 169 loose-fitted on the upper end of the first bush rod 168, the return spring 169 abutting at the lower end thereof on the upper end of the hollow rod 155, and a second bush rod 170 slidably fitted therein and placed on the first bush rod 168 and the return spring 169. On the upper face of the fork bolt 154, there is provided a housing 171 slidably fitted on the upper part of the second bush rod 170, the housing 171 being formed therethrough with a hole 173 having removably fitted therein a pin 172 adapted to be engageable with the upper peripheral wall of the second bush rod 170.

As shown in FIG. 18, which shows the structure of the housing 171 including an application mechanism for inserting therein and removing therefrom the pin 172, each of the paired fork assemblies 150, 150 has at the upper end thereof the housing 171 provided thereon and formed therethrough with the hole 173 in which the pin 172 is slidably fitted, while the two pins 172, 172 of the fork assemblies 150, 150 are interconnected by a cable wire 174. The pin 172 of either (left in FIG. 18) fork assembly 150 is normally biased with a return spring 175 in the opposite direction to the other fork assembly 150 (leftwardly in FIG. 18), and the pin 172 of the other (right in FIG. 18) fork assembly 150 has another cable wire 176 fastened thereto at its one end, the cable wire 176 being connected at the other end thereof to a hand lever 178 mounted on a handle bar 177, so that by operating the hand lever 178 the pins 172, 172 can be both slided (rightwardly in FIG. 18) in the direction opposite to the biasing direction of the spring 175, thereby disengaging the pins 172, 172 from the second push rods 170, 170 at a time. In such state, at each fork assembly 150, the second push rod 170 is caused to project upwardly of the housing 171 by the resiliency of the spring 169, and a slidable member 179 fixedly fitted on the lower end of the first bush rod 168 and slidably fitted in the upper part of the cylindrical holder 156 is positioned above the oil holes 159 of the cylindrical holder 156.

Under such conditions, after the first and second bush rods 168, 170 are moved downwardly by pushing from above the second bush rod 170, when the hand lever 178 is released, the pin 172 will be moved by the resiliency of the return spring 175 (leftwardly in FIG. 18) in the biasing direction thereof, thus again being brought into engagement with the second bush rod 170. In this state, the slidable member 179 fixed to the lower end of the first bush rod 168 is positioned below the oil holes 159 of the cylindrical holder 156.

Incidentally, in FIGS. 16 to 18, designated at reference numeral 180 is a spring interposed between the fork bolt 154 and an upper piston 181 secured to the upper end of the seat pipe 153, 182 is a lower piston secured to the lower end of the fork pipe 152, 183 is an oil path formed in the reduced lower part of the cylindrical holder 156, 184 is one of a plurality of oil holes opened in the lower peripheral wall of the seat pipe 153, 185 is an oil lock piece, 186 is a bottom piece adapted to produce damping force at the bottom of the seat pipe 153, 187 is an oil lock collar, and 188 is an oil seal.

There will be described below the function of the telescopic suspension according to the fifth embodiment of the invention as applied to a motorcycle.

At first, before starting the motorcycle, at each fork assembly 150, the pin 172 is assumed to be disengaged from the second bush rod 170 by operating the hand lever 178. Under such state, the second bush rod 170 is to be pushed down, compressing the return spring 169, then the first and second bush rods 168, 170 are to be moved down concurrently. As a result, the slidable member 179 secured to the lower end of the first bush rod 168 is positioned below the oil holes 159 of the cylindrical holder 156.

Thereafter, the hand lever 178 is to be released to bring the pin 172 into engagement with the second bush rod 170, and the first and second bush rods 168, 170 are to be fixed. In such state, the slidable member 179 interrupts the communication between the oil holes 159 and 160, thus shutting the intercommunication between upper and lower hydraulic chambers A, B formed inside of the seat pipe 153 and arranged above and below the first piston 157, respectively. Namely, at each fork assembly 150, the communication route for the expansion stroke is interrupted to be locked, thus restricting the expansion. Incidentally, under such conditions, when the fork assembly 150 is pushed downwardly, the hydraulic oil in the lower chamber B will be let through the orifices 165, the oil path 183, the oil holes 160, and the oil paths 161, thus opening the check valve 162, into the upper chamber A, pemitting a voluntary contraction of the fork assembly 150, which means the lock position may be set in a voluntary manner before starting the motorcycle.

When desired after the motorcycle has entered a normal running state, the pin 172 is to be disengaged from the second bush rod 170 by operating the hand lever 178. As a result, by the resiliency of the return spring which supported at the lower end thereof by the upper end of the hollow rod 155, only the second bush rod 170 is moved upwardly, leaving the first bush rod 168 as it is. Subsequently, when the fork assembly 150 has experienced the first contraction stroke, the first bush rod 168 is moved upwardly with large pressures exerting against the lower face of the slidable member 179. Accordingly, the slidable member 179 is positioned above the oil holes 159, rendering alive the communication route for expansion stroke, so that hydraulic oil flows from the upper chamber A to the lower chamber B while achieving a balanced state, thus permitting the expansion process developed till the stroke for normal running is given. In this respect, under normal running conditions, the damping force in the contraction stroke is produced by causing hydraulic oil of the lower chamber B to flow through the orifices 165, the oil path 183, the oil holes 160, and the oil paths 161, thus opening the check valve 162, into the upper chamber A, while that in the expansion stroke is obtained by causing hydraulic oil of the upper chamber A the flow through the oil holes 159 and 160 and the oil paths 161, thus opening the check valve mechanism 164, and through the oil path 163 into the lower chamber B, as well as from the oil holes 160 through the oil paths 183 and the orifices 165 into the lower chamber B.

In the foregoing embodiment of the invention, the pin 172 is employed in no limited way as a fixing means for fixing the first and second bush rods 168, 170. In this respect, such means may comprise a cam member abutting on the upper end of a bush rod. Moreover, without prejudice to a cylindrical holder provided with oil holes and a piston, there may be employed a hollow rod directly embodied with such implements.

Further, in the respective embodiments of the invention, the application is exemplified by a motorcycle. In this respect, it will be comprehended that the present invention is favorably applicable to motored tricycles and buggies as well.

As will be understood from the foregoing description, according to the present invention, there is provided a telescopic front suspension for motorcycles and motored tricycles, which can be restricted of its expansion at a predetermined degree of contraction, thereby achieving various advantages such that the vehicle level as well as the center of gravity is permitted to be kept low, thus improving the foot-grounding nature, when starting such vehicle.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A telescopic front suspension, comprising:
a bottom case supporting a front wheel of a vehicle;
a fork pipe slidably fitted in said bottom case;
resilient spring means for resisting telescopic action; and
restriction means readily available to an operator for restricting the amount of telescopic action, at a predetermined degree of contraction between said bottom case and said fork pipe, the relative expansion between said bottom case and said fork pipe, whereby the damping characteristics of the front suspension may be changed.

2. A suspension according to claim 1, wherein:
said restriction means comprises a pin provided on a first member consisting of one element of a set of said bottom case and said fork pipe, a hook substantially supported by a second member consisting of another element of said set of said bottom case and said fork pipe, and said hook being hookable on said pin.

3. A suspension according to claim 2, wherein:
said restriction means further comprises a hollow pipe substantially supported by said second member, a rod axially movably accommodated in said hollow pipe, and a movement control member for controlling the movement of said rod; and
said hook is supported at the lower end of said hollow pipe and adapted to be lockable and unlockable of a pivotal movement thereof by an axial movement of said rod.

4. A suspension according to claim 1, wherein:
said bottom case and said fork pipe are hydraulically controlled for the relative position with respect to each other;
said suspension further includes a first communication route for hydraulically effecting the contraction between said bottom case and said fork pipe, and a second communication route for hydraulically effecting the expansion between said bottom case and said fork pipe; and
said restriction means includes an externally operable interruption element for interrupting the communication of said second communication route.

5. A suspension according to claim 4, further comprising:
a hollow seat pipe planted in the bottom part of said bottom case;
said seat pipe having at the upper end thereof a piston slidable along the inner surface of said fork pipe;
a collar provided at the lower end of said fork pipe;

said collar having a first gap defined by and between the inner circumference of said collar and the outer circumference of said seat pipe;

a rebound seat provided at the lower end of said fork pipe;

said rebound seat having a second gap defined by and between said rebound seat and the outer circumference of said seat pipe;

a free valve slidably fitted on said seat pipe between said collar and said rebound seat;

said free valve being adapted to block said first gap in said relative expansion;

a first hydraulic chamber defined by and between the lower end of said fork pipe and the bottom part of said bottom case;

a second hydraulic chamber defined in said fork pipe and by and between said rebound seat and said piston;

a third hydraulic chamber defined in said fork pipe and above said piston;

said first gap and said second gap defining said first communication route;

an oil path defining said second communicating route and being formed in a side wall of said bottom case for inercommunicating said first hydraulic chamber with said second hydraulic chamber; and said restriction means including a valve adapted to open and close said oil path, and an open-close operation member for operating to open and close said valve.

6. A suspension according to claim 4, further comprising:

a hollow seat pipe planted in the bottom part of said bottom case;

said seat pipe being slidable at the upper end thereof in the interior of said fork pipe;

a jack member provided in the upper part of said fork pipe;

said jack member extending downwardly from the upper end of said fork pipe;

a small-diameter pipe provided in said jack member;

said small-diameter pipe extending downwardly from the upper end of said jack member, with an annular space defined therebetween;

a hollow rod having a larger diameter than said small-diameter pipe;

said hollow rod being telescopically fitted to said small-diameter pipe;

said hollow rod having at the upper end thereof a first piston slidably fitted in said jack member and at the lower end thereof a second piston slidably fitted in said seat pipe;

a cap closing the lower end of said jack member;

said cap being slidably fitted on said hollow rod;

a first hydraulic chamber defined by and between said first piston and said cap;

a first sub-tank having therein a second hydraulic chamber hydraulically communicating with said first hydraulic chamber;

a first oil path defining said second communication route and leading from said first hydraulic chamber through said hollow rod and said small-diameter pipe to said second hydraulic chamber;

a third hydraulic chamber defined in said jack member and above said first piston;

a second sub-tank having therein a fourth hydraulic chamber hydraulically communicating with said third hydraulic chamber;

a second oil path defining said first communicating route and leading from said third hydraulic chamber to said fourth hydraulic chamber;

a check valve provided in said second oil path; and said restriction means including a rod member adapted to open and close said first oil path, and an actuation member for actuating said rod member.

7. A suspension according to claim 6, wherein:

said first sub-tank has slidably fitted therein a third piston defining at either side thereof said second hydraulic chamber and at the opposite side a first gas chamber; and said second sub-tank has slidably fitted therein a fourth piston defining at either side thereof said fourth hydraulic chamber and at the opposite side a second gas chamber.

8. A suspension according to claim 6, wherein:

said rod member is provided in an end wall of said first sub-tank.

* * * * *